Feb. 5, 1952      H. R. REYNOLDS      2,584,740
SELF-LOCKING BEARING COLLAR
Filed Sept. 12, 1946
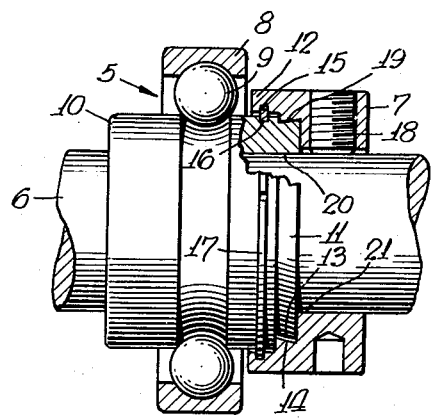
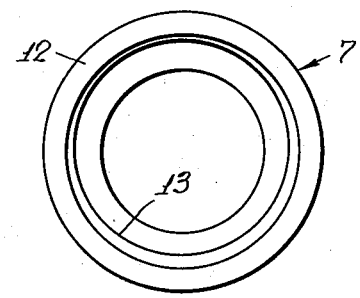
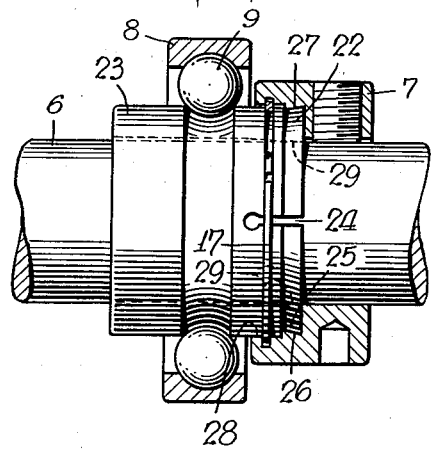
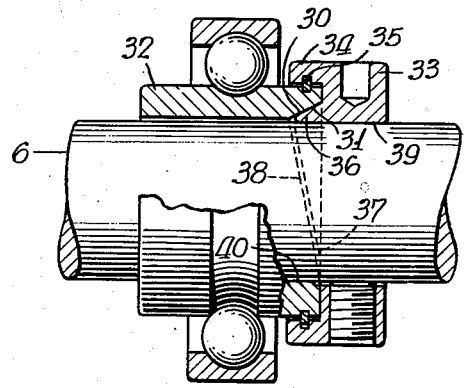
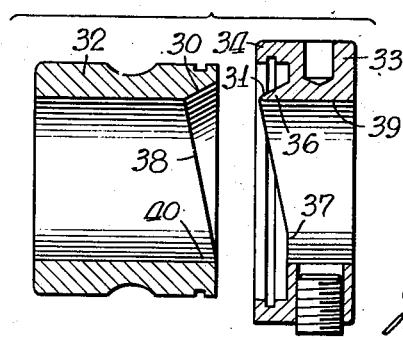
INVENTOR
*Harry R. Reynolds*
BY
ATTORNEYS.

Patented Feb. 5, 1952

2,584,740

UNITED STATES PATENT OFFICE 2,584,740

SELF-LOCKING BEARING COLLAR

Harry R. Reynolds, New Britain, Conn., assignor to The Fafnir Bearing Company, New Britain, Conn., a corporation of Connecticut Application September 12, 1946, Serial No. 696,513

14 Claims. (Cl. 287—52.09)

My invention relates to a self-locking collar and in particular to a combination including such a collar for securely binding the inner ring of an anti-friction bearing to a shaft.

It is an object of my invention to provide an improved means for binding a bearing ring to a shaft.

It is another object to provide in unit-handling relation with an anti-friction bearing a locking collar suitable for binding the inner ring to a shaft.

It is a further object to provide an improved means for locking the inner ring of an anti-friction bearing on a shaft and, at the same time, for locking said means to said inner ring against axial displacement therefrom.

Briefly stated, my invention contemplates a ring to be secured to a shaft by means of a locking collar supported in unit-handling relation with one end of said ring. The ring and the collar are locked to the shaft by a relative rotation of eccentrically formed interfitting surfaces on said collar and on said ring. In the specific forms to be described, means are provided on and between said ring and said collar for preventing axial displacement of the ring with respect to the collar and for improving the effectiveness of the camming action of the interfitting eccentric surfaces. The axis of such eccentricity may be parallel to and displaced from the axis of the inner ring or, alternatively, the eccentric axis may be at an angle with the axis of the inner ring.

In the drawings, which show, for illustrative purposes only, preferred forms of the invention:

Fig. 1 is a view in partial section of a preferred form of collar-and-bearing combination according to the invention;

Fig. 2 is an end view (looking left to right in the sense of Fig. 1) of the locking collar employed in the combination of Fig. 1;

Fig. 3 is a view similar to Fig. 1 illustrating an alternative combination according to the invention;

Fig. 4 is a partially broken-away sectionalized view of a third alternative combination; and Fig. 5 is a sectionalized view of elements of Fig. 4, in disengaged relation.

In said drawings, an anti-friction bearing 5 is shown mounted on a shaft 6 and cammed into secure locking engagement with the shaft by means of a locking collar 7. The anti-friction bearing 5 includes an outer race-ring 8, which may be mounted in a pillow block or other means (not shown), a plurality of anti-friction elements 9, and an inner race-ring 10. In Fig. 1 the inner ring 10 is shown with an axially extending end 11 overlapped by a flange 12 on the locking member or collar 7. The end 11 and the flange 12 are provided with contiguous or interfitting arcuate surfaces 13—14 eccentric with respect to the axis of the shaft 6. In the form shown, the axis of eccentricity is parallel to and displaced from the axis of the shaft 6, and the camming surfaces 13 and 14 are generally frusto-conical. In accordance with the invention, substantially coplanar circumferential grooves 15—16 in the end 11 and within the flange 12 may accommodate a split ring snap ring 17 or other means for locking the collar 7 to the inner race 10 against axial displacement therefrom.

In use, it will be appreciated that the locking wire or snap ring 17 may retain the collar 7 in unit-handling relation with the inner ring 10 and that, upon a relative rotation of the ring and of the collar, diametrically opposed portions of these members will be caused to approach each other by virtue of the camming action of the eccentric surfaces 13 and 14. Thus, when it is desired to mount my bearing and locking collar on a shaft, the ring 10 should first be angularly set with respect to the collar 7 so that the above-mentioned diametrically opposed portions are most spread apart, to permit clearance for a sliding fit on the shaft 6. When in the desired position on the shaft, the collar 7 and the inner ring 10 may be manually rotated with respect to each other, for a preliminary binding of the bearing-and-collar assembly to the shaft 6. The set screw may then be driven into abutment with the shaft 6. Soon after the shaft 6 commences to rotate, the natural tendency of the inner ring 10 to "creep" around the shaft 6 will cause the eccentric surfaces 13 and 14 to cam the shaft-binding portions of the ring 10 and of the collar 7 even closer together. The resulting effective reduction in diameter has been found to establish a secure binding of the inner bearing ring upon the shaft, regardless of the direction of rotation of the shaft.

It has been mentioned that the eccentric surfaces 13 and 14 are frusto-conical. Preferably these frusto-conical surfaces flare generally outwardly in the left-to-right sense of Fig. 1. It will then be appreciated that surfaces 13 and 14 in addition to serving their function of providing a radial camming action also set up forces resisting axial separating displacement of the collar and the ring with respect to each other—thus relieving axial loads that may be imposed upon the locking ring 17 and on the shoulders of the grooves in which it fits.

For purposes of distinguishing the arrangement of Fig. 1 from the forms to be described, it will be understood that the binding engagements resulting from this arrangement exist at 19 (between the flange 12 and the end 11, at the high points of the camming eccentric surfaces 13—14), along a part 20 of the inner ring, and along a part 21 of the collar 7.

In Fig. 3, I show an alternative arrangement which may for convenience utilize the same locking collar 7 as has been described for the combination of Fig. 1. In principle, however, the locking engagement differs in that the end 22 of the ring 23 is split as at 24, whereby the said end becomes in effect circumferentially compressible. The eccentric camming surfaces 25, 26 on the collar 7 and on the ring 23, respectively, are again generally frusto-conical, and the same locking ring or wire 17 may be provided to retain the combination bearing and collar in unit-handling relation. It will be appreciated that, upon a relative rotation of the ring 23 and of the collar 7, the end 22 of the ring 23 may be circumferentially compressed. This compression results in such squeezing of the end 22 as to bind the inner ring 23 securely to a shaft 6. The nature of deformation of the inner ring 23 under this compression is indicated by dotted lines representing (with grossly exaggerated clearances, for emphasis) the inner surface of the inner ring 23 with respect to the adjacent surface of the shaft 6.

Again, for purposes of distinguishing the embodiments shown in the drawings, the binding points in the combination of Fig. 3 are at 27 (between the high points of the eccentric surfaces 25 and 26), at 28 (between the flange of collar 7 and the end 22, diametrically opposite point 27), and at the diametrically opposed portions 29 of the inner surface of the inner ring 23 (where the end 22 binds upon the shaft 6).

The embodiment of Fig. 4 incorporates generic features of the forms which have been described but differs therefrom principally in that the camming action between the eccentric surfaces 30—31 on the inner ring 32 and on the locking collar 33, respectively, occurs on the inner surface of the inner ring 32. Furthermore, the axis of eccentricity which defines the camming surfaces 30—31 may be angularly rather than linearly displaced from the axis of the inner ring 32, although it is preferred that these axes be substantially parallel. Thus, the collar 33 may comprise the flange 34 with circumferentially extending means 35 for locking the collar 33 against axial displacement from the inner ring 32, as well as a projection or lip 36 carrying the eccentric surface 31.

To minimize the amount of metal removed and to simplify the turnings the lip 36 is cut back from its highest and most projecting point to a point 37 where the eccentric surface is so low (i. e. closest to the axis of shaft 6) as not to contribute any camming action between the eccentric surfaces 30 and 31. To mate with the lip 36 on collar 33 the inner surface of the ring 32 may be correspondingly cut away as at 38, preferably with a slight clearance axially of the lip 36. In practice, it will be found convenient to form these camming surfaces by grinding an eccentric bevel into the outer end of the inner ring 32, and by matching this eccentric surface with a turned eccentric bevel on the collar.

In operation it will be appreciated that the combination of Fig. 4 will bind when the high points of the eccentric surfaces 30 and 31 force one side 39 of the inner surface of collar 33 into engagement with the shaft 6 at points generally diametrically opposite points 40 along the inner surface of the inner ring 32. It will further be appreciated that the predominant binding action will then occur substantially in planes normal to the axis of the shaft 6 and passing through the high points of the eccentric surfaces 30 and 31. It will be noted that this "normal" application of binding stresses is possible in the Fig. 4 combination by virtue of the substantially continuous nature of the inner surface of the inner ring 32, particularly where it binds (at 40) to the shaft 6. It will also be observed that the application of these stresses is materially assisted by the snap ring 35, which serves to resist axial separating displacement of the ring 32 from the collar 33; because of the circumferentially continuous nature of the attachment of the ring 32 to the collar 33, the "normal" application of binding stresses is further assured.

It will be clear that I have described relatively simple unitary structures comprising anti-friction bearing rings and means for securely locking them to a shaft. Not only do my novel combinations result in increased effectiveness of binding engagement on the shaft with prolonged rotational use of the shaft, but the interfitting parts are such as to improve the binding relationship with each other with such prolonged use.

While I have described my invention in detail for the preferred forms shown, it will be understood that modifications may be made within the scope of the invention as defined in the claims which follow.

I claim:

1. In combination, an anti-friction bearing having an inner ring having an inner surface to be mounted upon a shaft, a locking-ring member secured to said ring and having a bore to fit the shaft at one end of said ring, said member having a flange extending coaxially with a part of said inner ring, said flange and said part having contiguous generally concentric locking surfaces which are eccentric with respect to the axis of the inner surface of said ring, each of said eccentric locking surfaces being flared in the same sense so that locking may be established over a relatively extensive contact between flared surfaces, and means circumferentially and radially non-bindably engaging both said flange and said ring for resisting axial displacement of said ring with respect to said member.

2. In combination, an anti-friction bearing having an inner ring to be mounted on a shaft, a locking-ring member secured to said ring and having a bore to fit the shaft at one end of said inner ring, said member having a peripheral flange extending over a part of said inner ring, said flange and said part having contiguous flared surfaces which will interlock upon a relative rotation of said ring and of said member with respect to each other, said surfaces being flared in the same sense so that locking may be established over a relative extensive contact between flared surfaces, the inner surface of said flange and the outer surface of said part having substantially coplanar circumferentially extending grooves, and a snap ring fitting in both said grooves with a non-bindable radial clearance with the bottom of one of said grooves.

3. In an anti-friction bearing, an inner ring having a generally circumferentially compressible portion at one end, an eccentric surface on said end, a collar member having a correspondingly eccentric surface to mate with said first-mentioned eccentric surface, whereby said end portion may be effectively shrunk when said inner ring and said collar member are rotated with respect to each other, and means circumferentially and radially loosely engaging both said collar member and said ring.

4. In combination, a bearing including a ring to be mounted on a shaft, means for securing said ring to the shaft, said means including a locking-ring member having an eccentric camming surface and a bore to fit the shaft, a correspondingly eccentric continuous surface on said ring and contiguous with said first-mentioned camming surface, whereby upon a relative rotation of said ring and said member diametrically opposed portions of said ring and said member will be cammed into binding engagement on said shaft, each of said eccentric surfaces being flared in the same sense so that locking may be established over a relatively extensive contact between flared surfaces, and means in radially non-bindable relation with said ring and said member and circumferentially engaging both said ring and said member against axial displacement.

5. In combination, a bearing including an inner ring to be mounted on a shaft, a collar at one end of said ring for binding said ring to the shaft and having a bore to fit the shaft, and means extending circumferentially and non-bindably between a part of said ring and a part of said collar for locking said ring and said collar against axial displacement with respect to each other, said ring and said collar having interfitting flared eccentric surfaces, said surfaces being flared in the same sense, whereby upon a relative rotation of said ring and said member said eccentric surfaces may bind over a relatively extensive contact between flared surfaces to force said ring into binding engagement with shaft.

6. In combination, a bearing including an inner ring to be secured to a shaft, and a locking collar at one end of said ring, a portion of the inner surface of said ring being generally arcuate about an axis angularly displaced from the axis of the shaft, and a correspondingly arcuate surface on said collar to fit said first-mentioned arcuate surface, whereby upon a relative rotation of said collar and said ring said ring will be forced into binding engagement with the shaft.

7. The combination according to claim 6, in which circumferentially extending means engages both said ring and said collar against axial displacement with respect to each other.

8. In combination, an anti-friction bearing having an inner ring having a shaft-receiving bore, a locking collar at one end of said ring and having a shaft-receiving bore, and circumferentially extending means generally concentric with said ring and engaging both said ring and said collar against axial displacement with respect to each other, said ring and said collar including flared locking surfaces eccentric with respect to the axis of said ring, whereby upon mounting said collar and said inner ring on a shaft and upon a relative rotation of said ring and said collar said inner ring may be locked on the shaft, said surfaces being flared in the same sense so that locking may be established over a relatively extensive contact between flared surfaces.

9. In combination, an anti-friction bearing including an inner ring having at one end thereof a peripherally extending groove generally concentric with the axis of said inner ring, a locking member having a shaft-receiving bore and a flange overlapping said end, said flange having an internal groove opposite said first-mentioned groove and generally concentric with the axis of said member, and means non-bindably fitting in both said grooves and resisting axial displacement of said ring and said member with respect to each other, said member and said ring having contiguous flared locking surfaces eccentric to the axis of said ring, said surfaces being flared in the same sense so that locking may be established over a relatively extensive contact between flared surfaces.

10. The combination according to claim 9, in which the axis of said eccentricity is displaced from and parallel to the axis of said ring.

11. The combination according to claim 9, in which the axis of said eccentricity is angularly displaced from the axis of said ring.

12. In combination, an anti-friction bearing having an inner ring with an inner surface to fit upon a shaft, and a locking collar at one end of said ring, said inner ring being formed on a part of said inner surface with a bevel flaring radially and axially outwardly more on one radial side of the axis of said ring than on the diametrically opposite side thereof, and said collar being formed with a lip having correspondingly flared surface, whereby upon a relative rotation of said collar and of said ring said bevel and said lip will cam each other.

13. In combination, an anti-friction bearing having an inner ring, a locking collar, and circumferentially extending means engaging both said ring and said collar against axial displacement with respect to each other, said ring being formed on its inner surface with an eccentric bevel, and said collar being formed with a lip having an eccentric surface which will mate with said bevel.

14. A combination according to claim 9, in which said surfaces are flared in a direction to produce an axial reaction between said inner ring and said locking member tending to draw said locking member and said ring together.

HARRY R. REYNOLDS.

REFERENCES CITED

The following references are of record in the file of this patent:

UNITED STATES PATENTS

| Number | Name | Date |
|---|---|---|
| 506,039 | Freeman | Oct. 3, 1893 |
| 827,267 | Schmidt | July 31, 1906 |
| 1,526,008 | Olson | Feb. 10, 1925 |
| 1,561,443 | Searles | Nov. 10, 1925 |
| 1,604,690 | Halaby | Oct. 26, 1926 |
| 1,650,573 | Searles | Nov. 22, 1927 |
| 1,889,063 | Dunham | Nov. 29, 1932 |
| 2,226,524 | Ronge | Dec. 24, 1940 |
| 2,250,495 | Miller | July 29, 1941 |
| 2,273,379 | Searles | Feb. 17, 1942 |
| 2,312,590 | Reynolds | Mar. 2, 1943 |

FOREIGN PATENTS

| Number | Country | Date |
|---|---|---|
| 20,204 | Great Britain | Sept. 11, 1906 |